N. AGNEW.
Coffee Pot.
No. 111,505.
Patented Feb. 7, 1871.
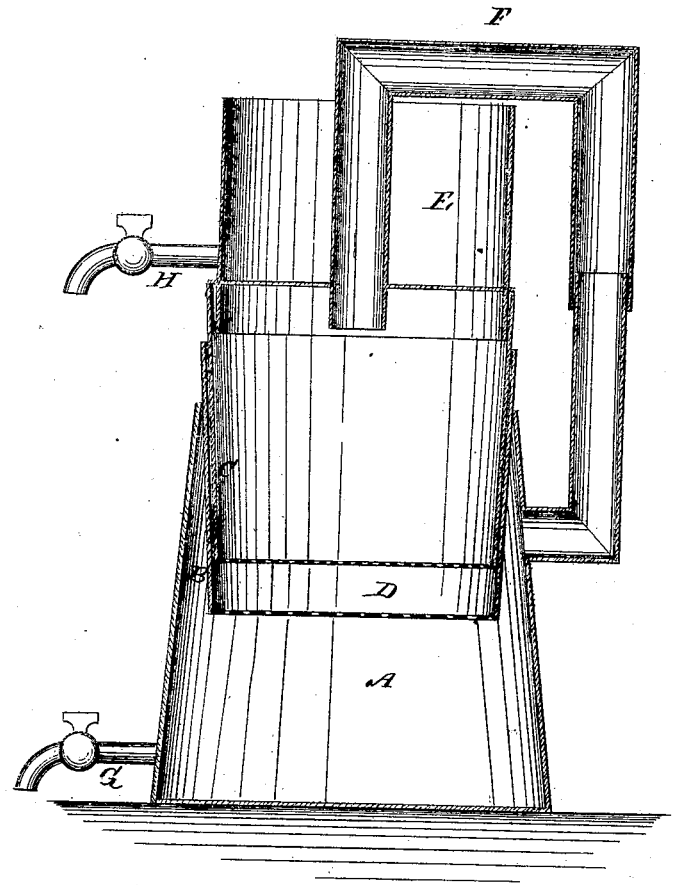

UNITED STATES PATENT OFFICE.

NIVEN AGNEW, OF DELAWARE, CANADA.

IMPROVEMENT IN COFFEE-POTS.

Specification forming part of Letters Patent No. 111,505, dated February 7, 1871.

*To all whom it may concern:*

Be it known that I, NIVEN AGNEW, of Delaware, in the Province of Ontario and Dominion of Canada, have invented a new and useful Improvement in Coffee-Pots; and I do hereby declare that the following is a full, clear, and exact description thereof, which will enable others skilled in the art to make and use the same, reference being had to the accompanying drawing, forming part of this specification.

The object of this invention is to so construct a vessel for making coffee that the full strength of the coffee may be extracted and the aroma preserved; and it consists in combining, with the boiling-chamber of a coffee-pot, percolating-cups and a condenser, and in connecting the upper percolating-cup with the boiling-chamber by a tube extending up through the condenser and downward on the outside, by means of which the vapor which rises is condensed or conveyed to the boiling-chamber, the arrangement being as hereinafter more fully described.

The accompanying drawing represents a vertical central section of my improved coffee-pot, which, in this example of my invention, is made to resemble a coffee-urn, being provided with a faucet instead of the ordinary spout for discharging the coffee. It also has a faucet for drawing off the condensing-water; but I do not confine myself to any particular form or construction of vessel so long as the vessel embraces the main features of my invention.

The percolating-cups and condenser may be applied to the common coffee-pot; and the steam-tube, instead of being attached directly to the side of a pot, may be connected with the common delivery-spout, in which case the common spout would form a portion of the tube, and in no wise vary the result aimed at.

A is the body of the vessel or boiling-chamber. B is the lower percolating-cup, with a perforated bottom placed in the top of A. C is the upper percolating-cup, placed within B, also with a perforated bottom. D is a space between the two perforated bottoms, in which the ground coffee is placed. E is a condensing-cup, for containing cold water, which is placed within and over the cup C. F is a tube, which passes through the bottom of the condenser E, thereby communicating with the percolating-cup C. From the bottom of the condenser the tube extends up and over the top of the condenser, and turns downward and connects in any convenient manner with the boiling-chamber A, as seen in the drawing.

G is the discharge-faucet. H is a faucet for the discharge of the condensing water. The ground coffee being placed in the space D, boiling water is poured into the upper percolating-cup, which, of course, finds its way into the boiling-chamber A.

The vapor or steam which rises is either condensed by means of the cold water which is placed in the condenser or conveyed or taken up by the tube F. More or less of the vapor will be condensed in the tube, and the resultant liquid will return to the boiling-chamber through the tube by its own gravity.

By this arrangement and mode of making coffee no clarifying substance is required. All the delicious flavor and aroma of the coffee are preserved, while the strength is extracted in the most perfect manner.

Having thus described my invention, I claim as new and desire to secure by Letters Patent—

In combination with a coffee pot or vessel for making coffee, the percolating-cups B and C, condenser E, and tube F, arranged and operating substantially as and for the purposes herein shown and described.

N. AGNEW.

Witnesses:
    JAMES C. MILLS,
    Rev. GEORGE GRANT.